US008662415B2

(12) United States Patent
Vollrath et al.

(10) Patent No.: US 8,662,415 B2

(45) Date of Patent: Mar. 4, 2014

(54) SPRINKLER DEVICE

(76) Inventors: Klaus Michael Andreas Vollrath, Mindarie (AU); Jurgen Klaus Vollrath, Rochester, NY (US)

( * ) Notice: Subject to any disclaimer, the term of this patent is extended or adjusted under 35 U.S.C. 154(b) by 105 days.

(21) Appl. No.: 13/068,120

(22) Filed: May 2, 2011

(65) Prior Publication Data

US 2011/0278373 A1 Nov. 17, 2011

(51) Int. Cl.

| | |
|---|---|
| ***B05B 15/10*** | (2006.01) |
| ***B05B 3/00*** | (2006.01) |
| ***B65D 1/32*** | (2006.01) |
| ***G01F 11/00*** | (2006.01) |
| ***G01F 13/00*** | (2006.01) |

(52) U.S. Cl.

USPC ........... 239/204; 239/206; 239/327; 222/209; 222/211

(58) Field of Classification Search

USPC .......... 239/204, 327, 328, 357, 206; 222/209, 222/211

See application file for complete search history.

(56) References Cited

U.S. PATENT DOCUMENTS

| | | | | |
|---|---|---|---|---|
| 1,958,385 | A | 5/1934 | Sweetland | |
| 2,901,183 | A * | 8/1959 | Kohl | 239/205 |
| 3,058,121 | A * | 10/1962 | Danko | 4/433 |
| 3,282,508 | A * | 11/1966 | Roberts | 239/204 |
| 4,145,003 | A * | 3/1979 | Harrison et al. | 239/288 |
| 4,834,290 | A * | 5/1989 | Bailey | 239/205 |
| 4,919,332 | A * | 4/1990 | Bailey | 239/205 |
| 8,079,531 | B2 * | 12/2011 | Katzman et al. | 239/204 |
| 8,083,158 | B2 * | 12/2011 | Katzman et al. | 239/204 |
| 2010/0090024 | A1 * | 4/2010 | Hunnicutt et al. | 239/204 |

FOREIGN PATENT DOCUMENTS

| | | | |
|---|---|---|---|
| JP | 2010-188284 | A | 9/2010 |
| WO | WO 2005/011359 | A1 | 1/2005 |
| WO | WO 2008/053459 | A1 | 5/2008 |

OTHER PUBLICATIONS

EPO Extended Search Report, Application No. EP 11164835, Oct. 10, 2011 Oct. 3, 2012.

* cited by examiner

*Primary Examiner* — Len Tran

*Assistant Examiner* — Alexander M Valvis

(74) *Attorney, Agent, or Firm* — Jurgen Vollrath

(57) ABSTRACT

A pop up sprinkler having a membrane which has a neutral position mounted to a housing and a sprayer head which is able to expand or contract under water pressure which moves the sprinkler head up and down.

13 Claims, 8 Drawing Sheets

SPRINKLER DEVICE

FIELD OF THE INVENTION

The present invention relates to a sprinkler device.

BACKGROUND TO THE INVENTION

Sprinkler heads often utilise a sprayer that pops up when water pressure is applied. The pop up sprinkler device allows the sprayer to be retracted below ground level when not in use. As sprinkler heads are often used in grass areas over which there may be cars driving or people walking, the retraction reduces the likelihood of damage to the sprinkler device due to inadvertent impact.

The most common form of pop up sprinkler comprises a cylindrical housing having an internal slidable piston. The piston is spring biased to pull it into the housing and has a sprayer head on the end. Water pressure within the housing pushes the piston out of an aperture in the top of the housing in use. In order to minimize water leakage between the housing and the piston the abutting surfaces have to form a watertight seal, e.g., through the use of an o-ring.

A regular problem with such pop up sprinklers is that any debris around the sliding piston can cause it either not to slide out when water pressure is applied, or not to retract when the water is turned off. Regular maintenance is therefore required to keep such sprinklers in good working order.

As a further issue, as such sprinklers must be constructed of an inflexible plastic material, walking or driving over the sprinkler device even when in the retracted position can result in damage to the sprinkler head.

SUMMARY OF THE INVENTION

According to one aspect of the present invention there is provided a sprinkler device comprising: a housing having an inlet opening for a water supply, the housing further having an opening at an operatively upper end, and a flexible membrane that is deformable between a first configuration and a second configuration, the membrane defining a site for securing a sprayer head to the membrane, wherein the supply of water via the inlet opening causes the flexible membrane to change configuration from its first configuration in which the sprayer head is in a first position, and its second configuration in which the sprayer head is in a second position.

The site for securing the sprayer head may comprise an opening in the membrane for receiving a sprayer head.

The second position preferably causes the sprayer head to extend at least partially from the opening in the operatively upper end of the housing The sprinkler device may include a cap with a cap opening for allowing the sprayer head to extend through the cap opening.

The membrane may be mounted to the housing or to the cap so that at least part of the membrane is located within the housing in the first configuration.

For purposes of this application the terms “top” and “bottom”, and the terms “upper” and “lower” refer to the sprinkler device in its operative state.

The housing may have an open upper end, the open upper end defining the opening at the operatively upper end of the housing. The flexible membrane may comprise a domed member having a circular peripheral portion extending over the open upper end of the housing to define a peripheral lip.

The flexible membrane may have a substantially concave shape in its first configuration and a substantially convex shape in its second configuration, when viewed from the top.

The opening in the flexible membrane may, in the concave configuration be located below the open upper end of the housing, and in the convex configuration extend above the open upper end of the housing.

The domed member may have a wall of uniform thickness along the periphery of the domed member, the wall thickness being different toward the centre of the domed member.

Preferably the flexible membrane is constructed of a material that is flexible but has limited stretchability. Also, the housing is preferably constructed of a flexible material. In one embodiment, the flexible membrane is constructed of Arnitel.

The flexible membrane may be made of a material providing the membrane with a memory. The memory may define the first configuration as a neutral memory configuration.

The memory membrane may provide a backward force against the water pressure in both its first and second configurations.

The housing may have a substantially concave configuration such that the open upper end defines a relatively wide opening and the inlet opening is defined by a threaded neck extending from an operatively lower end of the housing for receiving a complementarily threaded riser.

The sprinkler device may include a ring connectable to the open upper end of the housing to secure the peripheral lip of the flexible membrane to the housing.

The flexible membrane may be provided with a threaded neck defining the opening in the membrane and configured to receive a complementary thread on a sprayer head.

The flexible membrane may have a substantially convex shape in its first configuration and a substantially convex shape in its second configuration, when viewed from the top. The flexible membrane may define a bladder with a water inlet opening, the opening for securing the sprayer head defining a water outlet opening.

The bladder may have a compressed or collapsed configuration in its first configuration, and an expanded configuration in its second configuration.

The bladder may have a concatena shape, a conical shape when in its second configuration, an oblong shape (when viewed from the side) or a substantially spherical shape in its second configuration.

The device may include a spring for returning the flexible membrane from its second configuration to its first configuration.

The flexible membrane may define a bladder and the opening in the membrane for securing the sprayer head may be at an operatively lower end of the bladder.

The supply of water may exert pressure on an outer surface of the bladder to cause the bladder to be reconfigured from the first configuration in which the bladder is expanded, to the second configuration in which the bladder is compressed.

The device may include a spring for returning the flexible membrane from its second configuration to its first configuration.

The flexible membrane may be made of a material providing the membrane with a memory. The memory may define the first configuration as a neutral memory configuration.

BRIEF DESCRIPTION OF THE DRAWINGS

The invention will now be described, by way of example, with reference to the following drawings in which.

DETAILED DESCRIPTION OF PREFERRED EMBODIMENTS

Figure 1:
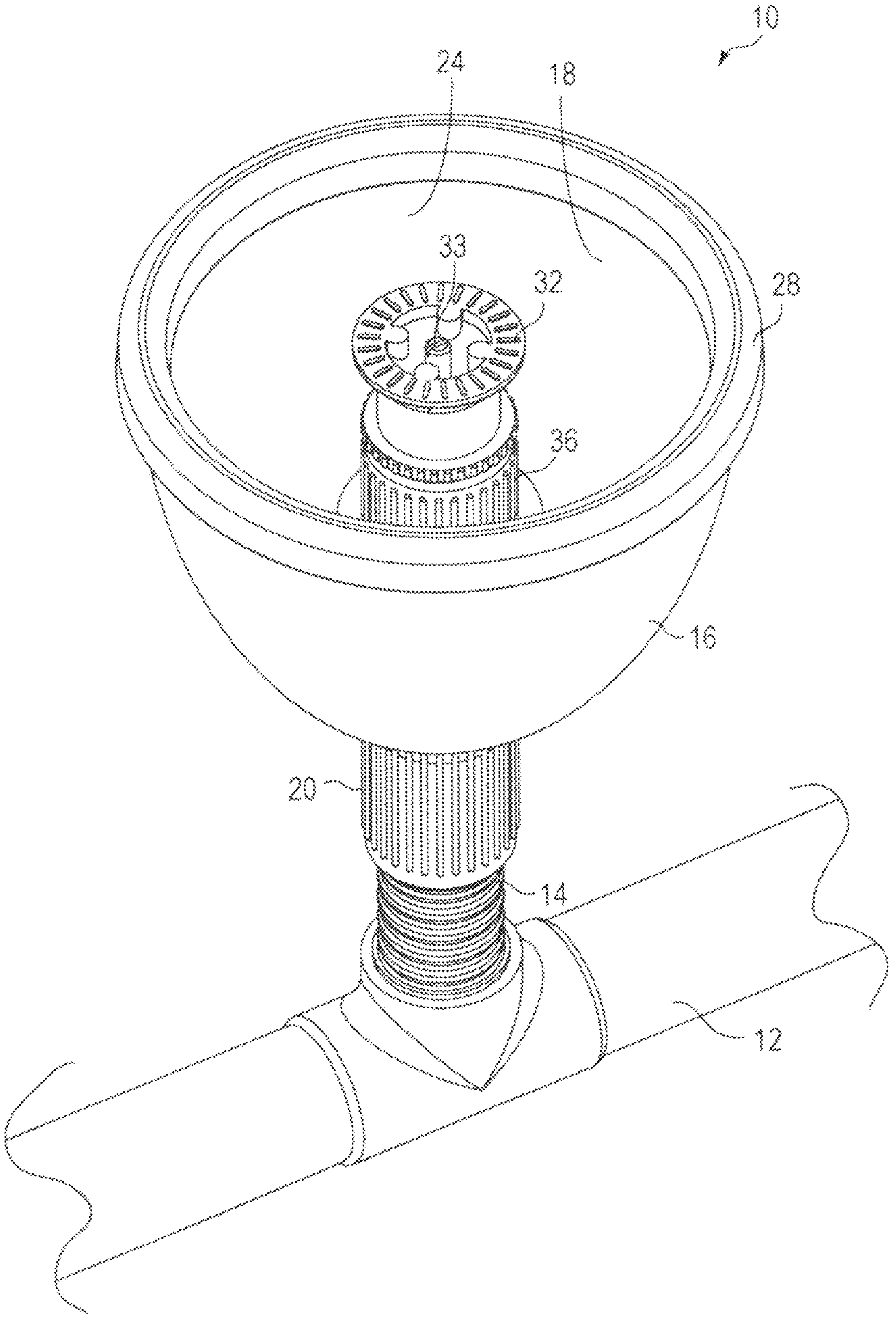
FIG. 1 is an upper perspective view of a sprinkler device in accordance with the present invention in a retracted configuration.

Referring to the Figures, there is shown a sprinkler device 10 for connection to a water supply. In the embodiment shown, the water supply is provided via a standard water conduit 12 having a threaded riser 14 extending upwardly onto which the sprinkler device 10 is connected.

The sprinkler device 10 comprises a housing 16 having an open upper end 18. The housing 16 has a concave configuration when viewed from the top (when the device is installed), the open upper end 18 comprising a relatively wide opening and the lower end forming a relatively narrow lower, inlet opening 19. The inlet opening 19 includes a neck 20, in this embodiment having an internal thread 22 for receiving a complementary thread on the riser 14. Water is thereby supplied to the inside of the housing 16 via the riser 14 and the inlet opening 19.

The sprinkler device 10 is provided with a flexible cover member 24 also referred to herein as a membrane. The flexible cover member 24 comprises a concave structure having an upper, outwardly extending circular peripheral lip with a diameter slightly greater than that of the open upper end 18 of the housing 16 such that the flexible cover member 24 can extend across the open upper end 18 in use, to be sealingly secured to the upper end 18 of the housing.

A ring 28 is provided that extends over the lip 26 and, in this embodiment, is crimped over the lip 26 of the flexible membrane 24 to secure the lip 26 to the upper edge of the housing 16. The ring 28 may comprise a ring of suitable metal, such as stainless steel. The flexible cover member 24 thereby seals across the open upper end 18 of the housing 16 to create an internal chamber 30.

The flexible cover member 24 is constructed of a material that is preferably flexible but exhibits low stretchability. Such a suitable material may be the plastic based material sold by DSM Engineering Plastics B.V. under the trade name Arnitel. The housing 16 is preferably constructed of a flexible material to avoid damage to the housing 16 or riser 14 if pressure is exerted on the housing, e.g., if a motor vehicle drives over the device.

Figure 2:
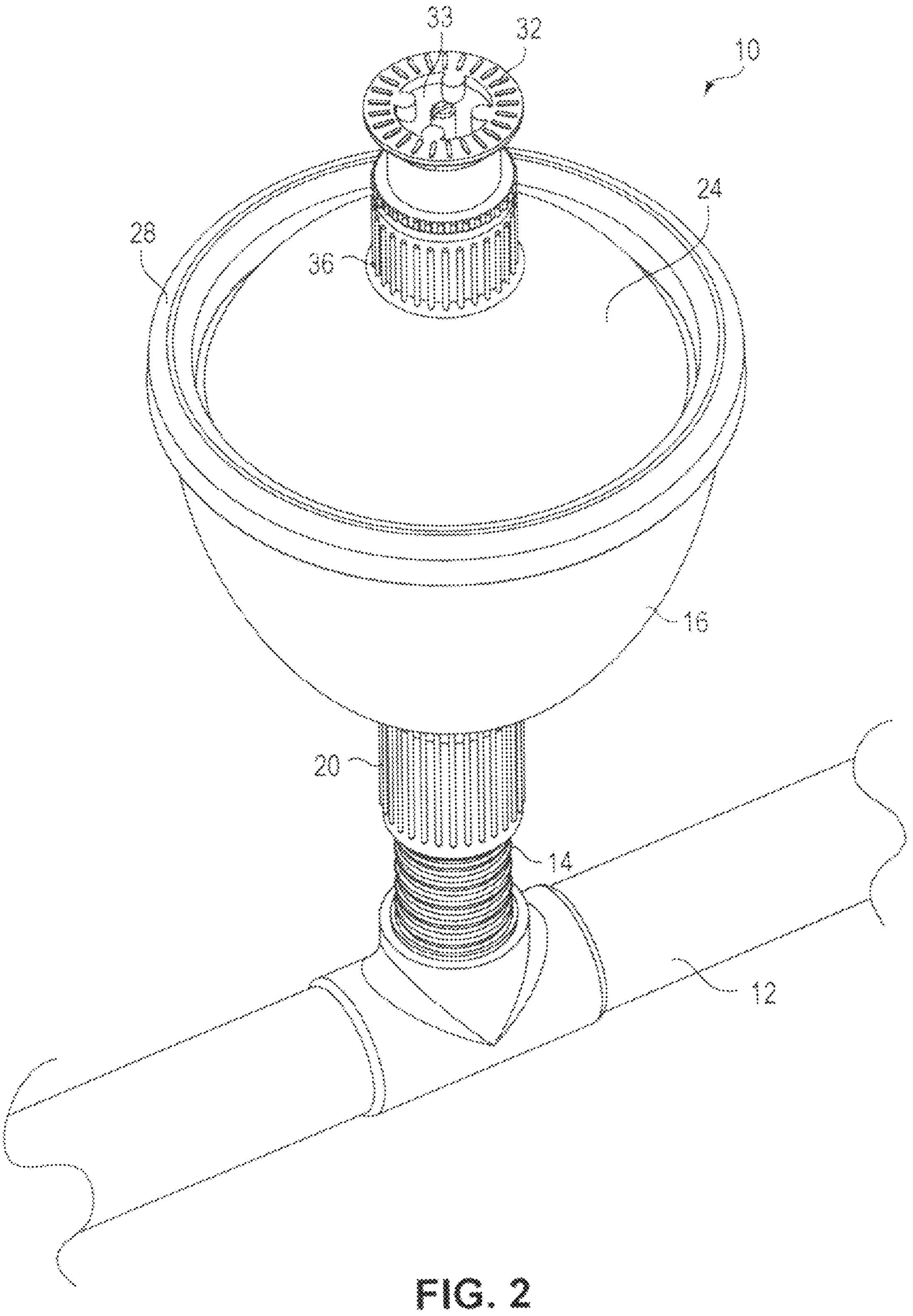
FIG. 2 is an upper perspective view of the sprinkler device of FIG. 1 in an extended position.
Figure 3:
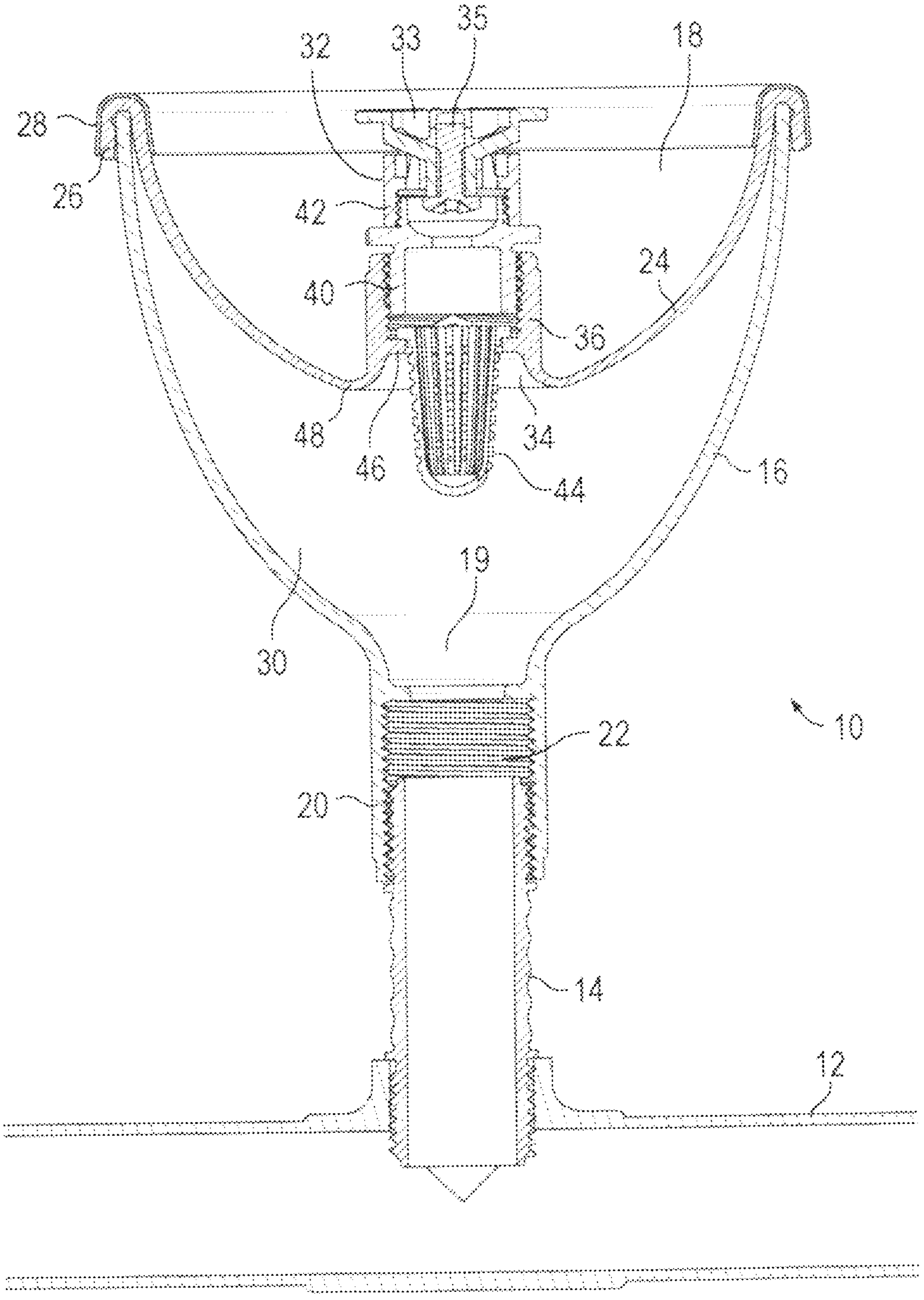
FIG. 3 is a side cross sectional view of the sprinkler device of FIG. 1 in the retracted position
Figure 4:
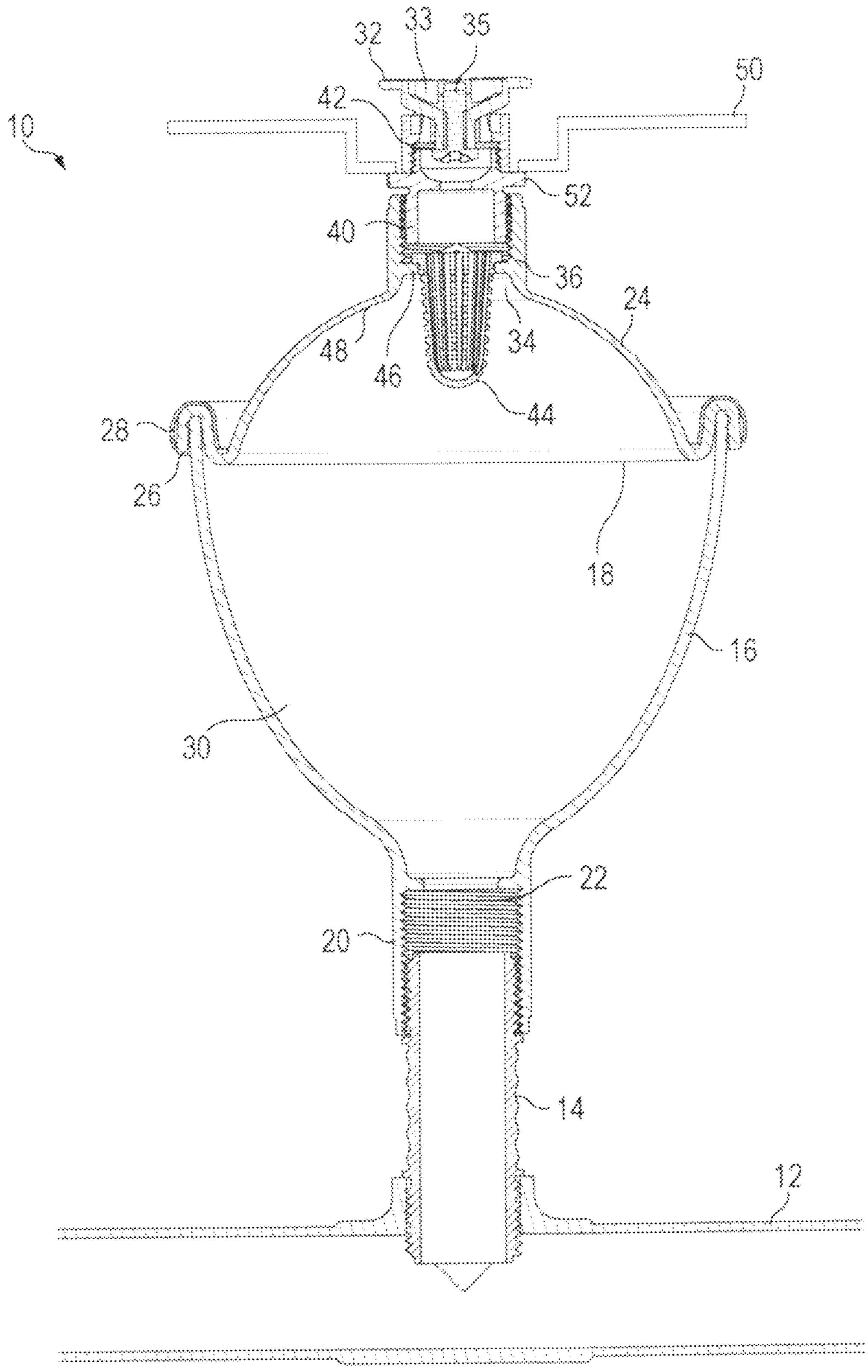
FIG. 4 is a side cross sectional view of the sprinkler device of FIG. 1 in the extended position.
Figure 5:
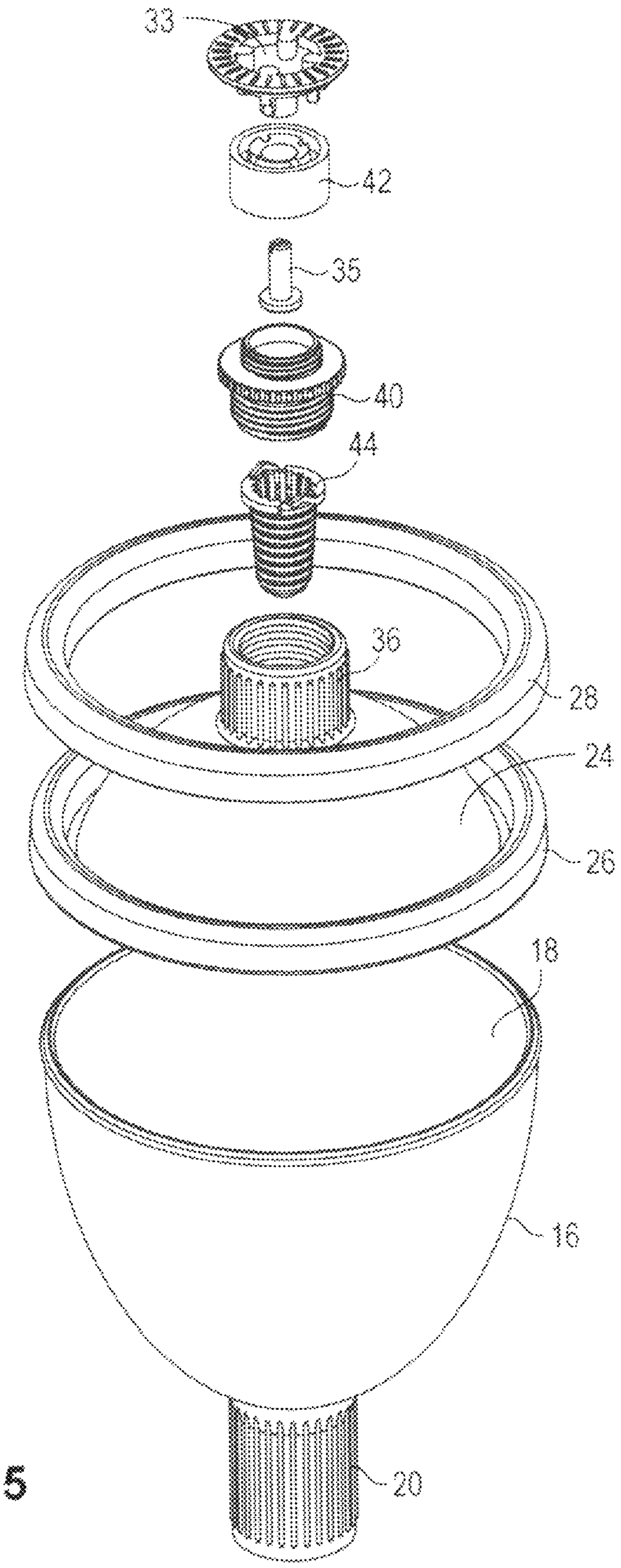
FIG. 5 is an exploded view of the sprinkler device of FIG. 1.

The flexible membrane 24 is configured such that in a relaxed state or neutral configuration, it is substantially concave in shape extending from the peripheral edge into the housing 16, as can be seen in FIGS. 1 and 3, and having an upper, outwardly extending lip 26 and a lower neck 36. It is sufficiently flexible however that a major portion of the flexible membrane 24 can be deformed to a convex configuration (as shown in FIGS. 2 and 4) under a force provided from within the housing 16. In the convex configuration, the centre of the flexible membrane 24 is moved to a position above the upper edge of the housing 16, in this embodiment.

A sprayer head 32 is provided in a central aperture 34 in the flexible membrane 24. Water under pressure within the chamber 30 can therefore exit outwardly through the sprayer head 32 under pressure to spray in the manner of a standard sprinkler device as known in the art.

The flexible membrane 24 is provided with an upwardly extending neck 36 defining the central aperture 34. The upwardly extending neck 36 includes a thread (in this embodiment an internal thread) for receiving a complementary thread on the sprayer head 32.

The sprayer head 32 that is provided in this embodiment comprises two parts, being a lower portion 40 and an upper portion 42. The lower portion 40 of the sprayer head 32 includes the I thread (in this case an external thread) at a lower end thereof that is received within the internal thread in the neck 36. An upper end of the lower portion 40 includes an external thread that is received in an internal thread in the lower end of the upper portion 42 of the sprayer head 32. The upper portion 42 of the sprayer head 32 includes a spray nozzle 33 through which water exits.

A filter 44 is also provided to prevent debris entering into the spray nozzle 33 of the sprayer head 32. In the embodiment shown, the filter 44 is secured between an inwardly extending peripheral lip 46 formed inside the neck at a lower end thereof and the lower portion 40 of the sprayer head 32. The filter 44 may alternatively be secured between the lower and upper portions 40 and 42 of the sprayer head 32. An adjuster screw 35 is also provided in the sprayer head 32 to adjust the flow rate through the sprayer head 32 in a known manner.

In use, when water is supplied to the chamber 30 within the housing 16, the pressure forces the flexible membrane 24 from the concave configuration to the convex configuration. As can be seen in FIGS. 2 and 4, in the convex configuration, the sprayer head 32 has been raised above the upper edge of the housing 16 and water can be sprayed out of the sprayer head 32 in the normal manner.

The flexible membrane 24 is preferably provided with a thinned portion 48 around the central aperture 34 to aid the flexible membrane 24 in rolling from the concave to the convex configuration.

In another embodiment the portion around the central aperture is thickened compared to the periphery of the flexible membrane. The wall thickness of the flexible membrane is preferably kept uniform along the periphery and may increase or decrease toward the neck 20 to ensure the uniform reconfiguration of the flexible cover as it moves between its concave and convex configurations.

In the embodiment shown above, the flexible membrane, in effect defines the cover to the housing 16. In order to protect the flexible membrane from debris and UV radiation from the sun, a separate cap or cover 50 may be provided as shown in FIG. 4 (not shown in the retracted configuration of FIG. 3). The cover 50 is provided with a central opening that is larger than the lower portion 40 of the sprayer head to allow it to ride up on the lower portion 40 when the flexible membrane 24 retracts into the housing 16. However, the central opening of the cover 50 is smaller than the sprayer head nozzle 33 and the lip 52 of the lower portion 40, to ensure that the cap 50 is retained on the sprayer head.

Figure 17:
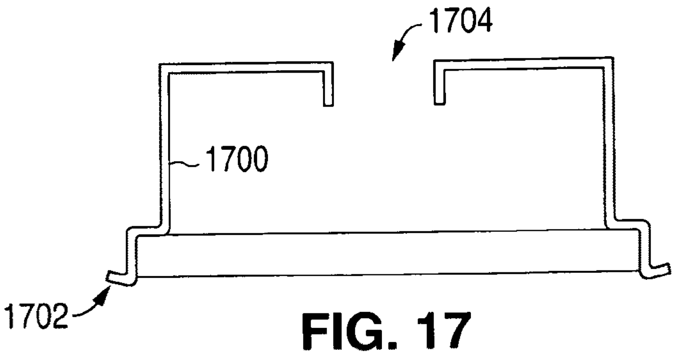
FIG. 17 is a sectional view of a cap for use with an embodiment as illustrated in FIGS. 1-5.

Another embodiment of a cover or cap for the sprinkler device of FIGS. 1-5, is shown in FIG. 17. The cap 1700 defines a peripheral lip 1702 allowing the cap to slip over the rim 28. A central opening 1704 formed in the cap 1700 allows the sprayer head to extend upwardly through the central opening when the flexible membrane is deformed to its convex configuration. It will be appreciated that when the device is used with the cap 1700, the device with its cap is preferably buried sufficiently deeply in the ground to align the upper surface of the cap 1700 substantially with the surface of the lawn or ground. Both the cap 1700, and the cap or cover 50 not only limit the debris falling onto the flexible membrane 24, but provide the added benefit of covering the device to avoid people inadvertently stepping into or tripping over the sprayer head.

The above embodiment defines only one embodiment of the invention, which can be implemented in numerous ways without departing from the scope of the invention, as defined by the claims.

Figure 6:
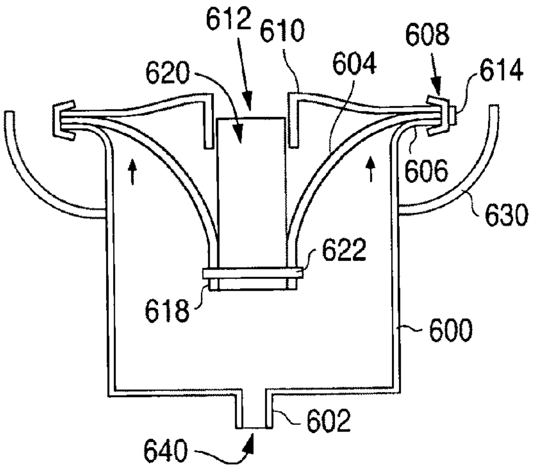
FIGS. 6-15 are sectional views through other embodiments of the invention.
Figure 7:
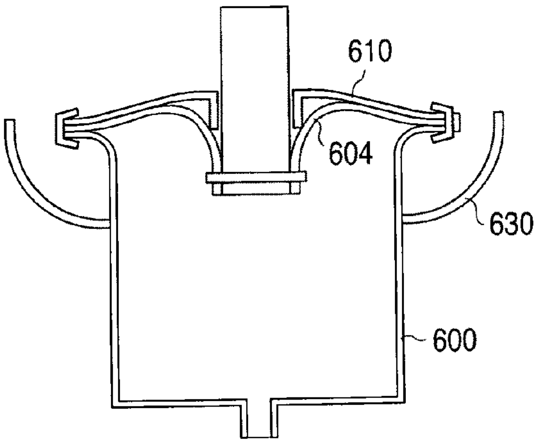
Figure 16:
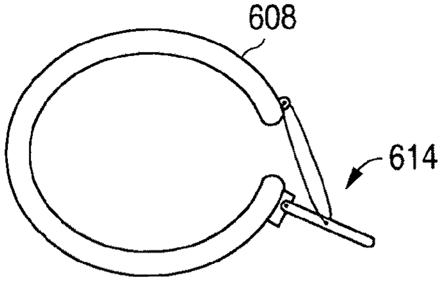
FIG. 16 is one embodiment of a securing ring for use with some embodiments of the invention.

For instance, another embodiment of the invention is shown in cross-section and FIGS. 6 and 7. This embodiment includes a housing 600 with an operatively lower connector tube 602 having an internal thread for receiving a complementarily threaded riser (not shown). A flexible membrane 604 having a convex configuration when viewed from the top is secured to an outwardly extending lip 606 of the housing 600 by means of a channel ring 608. A cap 610, having a central opening 612 is secured over the upper end of the housing 600 to limit dirt falling onto the membrane 604. As is shown in FIGS. 6 and 7, the ring 608 serves to clamp the cap 610 to the lip 606 of the housing to sealingly capture the periphery of the membrane 604 between the lip and the cap. The ring 608 has a substantially U-shaped cross-section in which the legs of the U extend slightly outwardly. As shown in the top view of FIG. 16, the ring 608 is a split, flexible ring with a lever clasp 614. It will be appreciated that when the clasp 614 is levered to its closed position it will tighten around the lip of the housing, wedging the cap 610 against the lip and securing the membrane. The membrane 604 is provided with a neck section 618 that defines an internally threaded central opening that receives a sprayer head 620 as known in the art. In this embodiment a ring or bracket 622, e.g. a ratcheting bracket is provided to give added support for the neck section 618.

In order to facilitate the removal of the cap 610 or of the membrane 604 e.g. for cleaning, the clasp 614 can simply be levered to its open position to release the cap and membrane. The housing 600 in this embodiment is provided with a circumferentially extending channel 630 integrally moulded into the housing to space the surrounding lawn from the clasp 614 for easy access and to prevent debris from falling into the housing when the cap is removed.

In practice, when water enters the inlet opening 640 of the housing the water pressure forces the membrane 604 with its sprayer head 620 upwardly to protrude through the opening 612 in the cap 610 as shown in FIG. 7. The membrane in this embodiment is deformed but retains a convex configuration both in its first configuration (FIG. 6) as well as its second configuration (FIG. 7) in which the sprayer head extends from the housing. The membrane 604 in this embodiment is made of a shaped memory material and configured to have a shape as shown in FIG. 6 when in its relaxed or neutral state. Thus, when the water pressure is relieved inside the housing, the membrane will return to its first configuration. The cap 604, in this embodiment serves not only to protect the inside of the housing from the ingress of debris but also to limit the vertical excursion of the membrane 604. It will be appreciated that one advantage of this embodiment is that the upper opening of the housing is covered by a cap that is secured to the top of the structure for easy removal and with little risk of debris falling into the housing.

Figure 8:
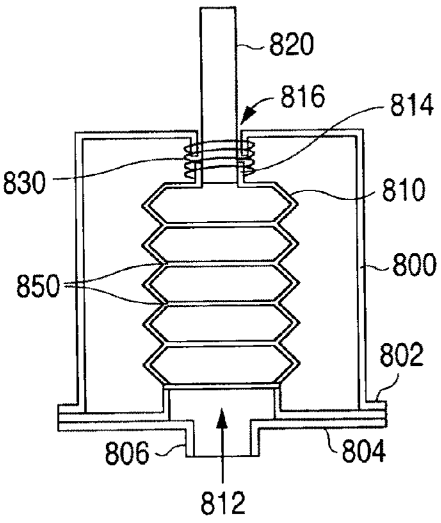
Figure 9:
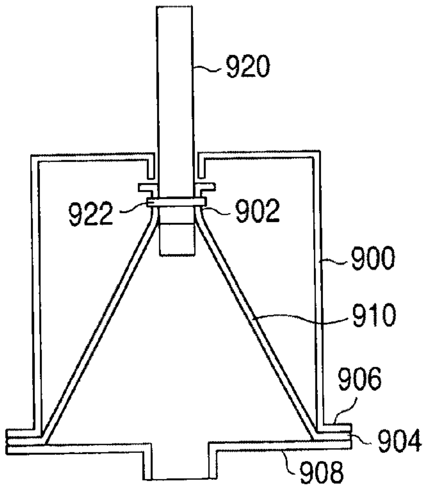

Another embodiment of the invention is shown in FIG. 8, which again includes a housing 800. In this embodiment the housing is open at its lower end, which is provided with an outwardly extending lip 802. A lower end cap 804 with threaded inlet pipe 806 is secured to the lip 802 e.g. using a ring similar to the ring 608 discussed above (not shown in FIG. 8). Again, a membrane is captured between the lip 802 and cap 804. In this embodiment, however, the flexible membrane 810 takes the form of a concatena-shaped bladder that has an inlet opening for receiving water via the pipe 806. The upper end of the bladder membrane 810 has a threaded neck portion 814 which defines an internally threaded opening for receiving a sprayer head 820, which is secured to the threaded neck portion by complementarily engaging the threads of the neck portion 814. Thus, when water enters the opening 812, the bladder membrane fills up and expands as shown in FIG. 8 to extend the sprayer head 820 through an upper opening 816 in the housing 800 to an extended or second position. In this embodiment, in order to ensure that the bladder membrane 810 retracts when the water pressure is relieved, a helical spring 830 is provided around the sprayer head extending between the bladder membrane 810 and the upper end of the housing 800. In order to ensure that the concatena shape of the bladder is not damaged due to the internal water pressure, strengthening rings 850 are provided around the indentations or troughs of the concatena. The rings may be defined by separately formed rings e.g. metal rings or nylon bands, or may be integrally formed as wall thickenings in the bladder. Yet another embodiment of the invention is shown in FIG. 9, which has a housing 900 similar to the embodiment of FIG. 8. In this embodiment, however, the membrane 910 defines a conical bladder with a large lower opening and an upper neck portion 902 defining a small upper opening for receiving a sprayer head 920. In this embodiment a support ring 922 is again provided to strengthen the neck portion 902. The lower end of the conical bladder membrane is provided with an outwardly extending skirt 904, which is received between a lip 906 of the housing and a lower end cap 908. The end cap 908 is secured to the lip 906 by any suitable means e.g. using a channel ring such as the ring 608 shown in the embodiment of FIG. 8. FIG. 9 shows the bladder in its filled or extended state (second position). The material of the membrane 910 is chosen to be flexible to allow the bladder to collapse once water pressure inside the bladder is relieved, allowing the sprayer head to retract into the housing. As in the embodiment of FIG. 8, a spring (not shown) may be provided between the upper end of the housing and the bladder or ring 922 to exert a downward pressure on the bladder thereby ensuring that the bladder returns to its first position when the water pressure inside the bladder is relieved.

Figure 10:
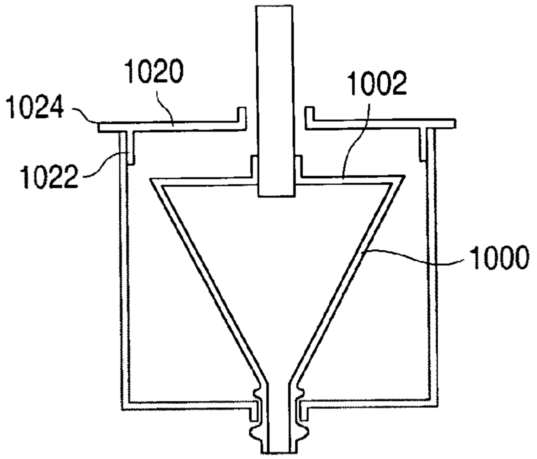

Another embodiment of the invention is shown in FIG. 10. In this embodiment the membrane 1000 defines a conical bladder with flexible side walls. An upper planar portion 1002 is provided with a thickened wall or with a support plate to ensure that the upper portion 1002 retains a substantially planar configuration. Water again enters the bladder in order to inflate the bladder, thereby moving the sprayer head 1010, which is secured to the upper end of the bladder, from a first (retracted position) to a second (extended) position as shown in FIG. 10. As in the embodiments of FIGS. 6-9 above, the housing 1010 is closed at its upper end except for a small opening to allow the sprayer head to extend out of the housing. In this embodiment, like the embodiment of FIG. 6, the housing 1010 is provided with a removable cap 1020 at its upper end, making it easier to clean out the housing. In this embodiment, the cap 1020 is provided with a downwardly extending flange 1022 for engaging the inner surface of the housing to allow the cap to simply be pushed down into place. In order to remove the cap 1020, the cap is provided with an outwardly extending lip 1024 to easily remove the cap from the housing. As mentioned above, the upper flattened portion 1002 of the bladder may be integrally formed with the rest of the bladder but have a thickened wall to retain a substantially flattened configuration, whereas the side walls are flexible to allow the bladder to collapse when internal water pressure is relieved. A spring (not shown) is used in this embodiment to help return the bladder to its first (collapsed) configuration.

Figure 11:
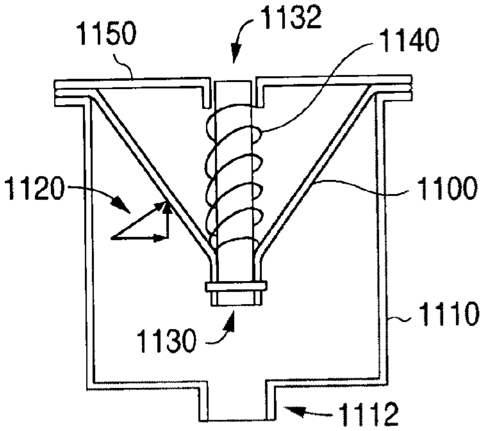

Yet another embodiment of the invention is shown in FIG. 11. In this embodiment a flexible membrane 1100 is again secured inside a housing 1110. However unlike the embodiments of FIGS. 8-10, which relied on an inflatable bladder in which the water pressure was exerted on the inner surface of the bladder to expand the bladder and mover the sprayer head upward to its second position, the embodiment of FIG. 11 relies on a bladder that collapses when water pressure is applied to its outer surface. In this embodiment the water enters the housing through an inlet 1112 and acts on the outer surface of the membrane 1100 as indicated by the arrow 1120. This force vector includes a vertical and a horizontal component as shown by the component vectors of arrow 1120. Thus the membrane will be forced inward and upward causing the sprayer head 1130 to move upward to its second position in which it protrudes from the housing (not shown). The water entering the housing will pass into the lower end of the sprayer head 1130 and spray out of the upper end 1132. A spring 1140 ensures that the sprayer head 1130 is retracted back into the housing 1110 when the water flow stops. It will be noted that this embodiment also provides an upper closure cap 1150 similar to that provided in the embodiment of FIG. 6, the cap 1150 being secured by any suitable means e.g., using a ring such as the ring 608 described above with respect to the embodiment of FIGS. 6 and 7.

Figure 12:
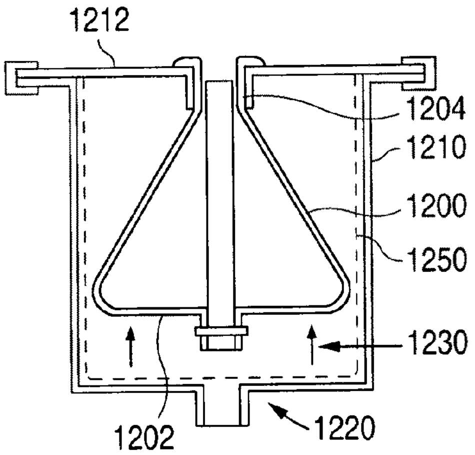

Another embodiment of a collapsing bladder configuration is shown in FIG. 12, in which the flexible membrane 1200 defines a conical balloon-like bladder with a flattened lower portion 1202 for providing a large surface area for vertical force vectors 1230. In this embodiment the housing 1210 also has its large opening at its upper end and is provided with a cap 1212 having a central opening 1214 to allow the sprayer head 1240 to extend from the housing when water pressure collapses the bladder 1200 and causes the flattened lower portion 1202 to be pushed upward. A spring (not shown) is preferably included between the upper neck 1204 of the bladder 1200 and the flattened portion 1202 to push the lower portion downward when water pressure inside the housing is relieved. Instead, a spring can be secured between the lower end of the bladder 1200 and the lower end 1220 of the housing to pull the flattened portion 1202 downward to its first position once the water flow ceases and the water pressure is relieved. It will be noted that in this embodiment the bladder 1200 is secured to the releasable cap 1212, thereby making the removal of debris from the housing a simple task of removing the cap and lifting out the bladder 1200. A removable sieve or filter 1250 may be provided in the housing to help lift out debris that has accumulated in the housing 1210.

Figure 13:
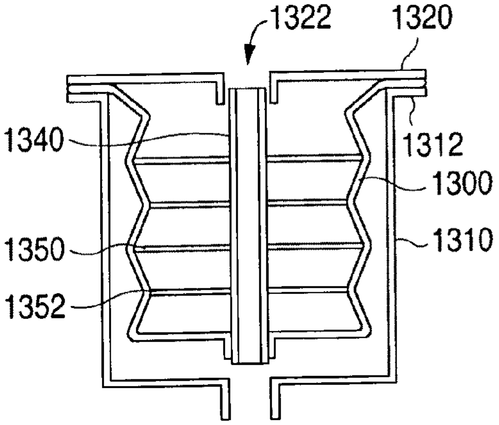

Yet another embodiment of a bladder configuration that collapses under water pressure is shown in FIG. 13, which makes use of a membrane defining a concatena-shaped bladder 1300 that is secured between a lip 1312 of housing 1310 and cap 1320. Again a ring such as the ring 608 discussed with respect to the FIG. 6 embodiment, or other clip or clamp can be used to secure the cap 1320 to the lip 1312. Thus, the outwardly extending periphery of the upper bladder opening is wedged between the cap 1230 and the lip 1312 in a manner similar to that described with respect to the embodiments of FIGS. 6 and 11. The bladder 1300 is collapsed by water entering the housing 1310, causing the concatena-shaped bladder to compress from its first position shown in FIG. 13 to its second, compressed configuration in which the lower end of the bladder is pushed upward to extend the sprayer head 1340 from the housing, through the opening 1322 in the cap 1320. Preferably the ridges and troughs of the concatena are strengthened by means of ribs or wall thickenings 1350, 1352 to prevent the concatena-shaped bladder from collapsing laterally as a result of the water pressure acting on the outer surface of the bladder. The embodiments of FIGS. 12 and 13 have the advantage that their bladders 1200, 1300 are not secured to the bottom of their housing and that their caps 1212, 1320 are releasable secured to the tops of their housings. Thus removal of the cap is easy and dirt tends not to fall into the housing since the upper rim is at or near the surface of the soil. Also, the bladder 1200, 1300 can readily be removed to allow the interior of the housing 1210 (in the case of the FIG. 12 embodiment) or the interior of the bladder 1300 (in the case of the FIG. 13 embodiment) to be cleaned. The FIG. 13 embodiment has the additional advantage that any debris falling into the opening 1322, next to the sprayer head 1340, ends up in the bladder 1300, which can be removed and rinsed out.

Figure 14:
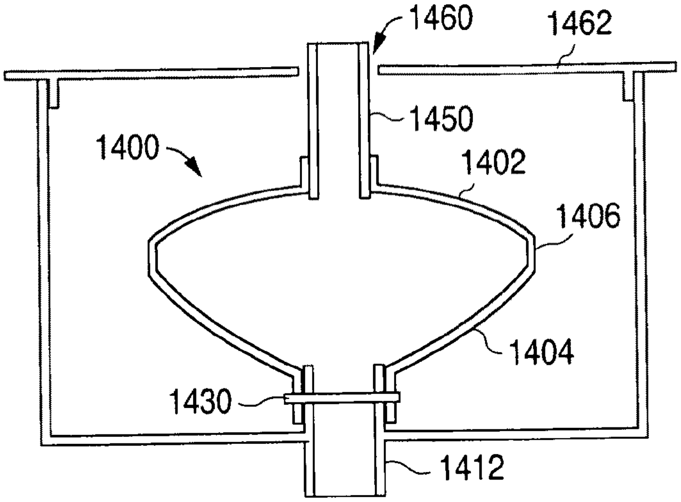
Figure 15:
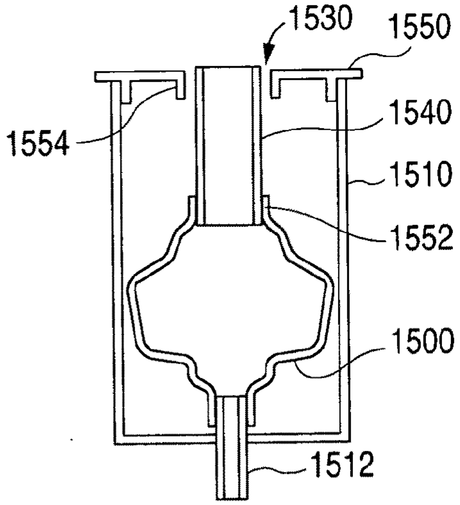

Two further expandable bladder configurations are shown in FIGS. 14 and 15. The flexible membrane that defines the bladder 1400 of FIG. 14 has an oblong or oval configuration when viewed from the side, and a round configuration when viewed from the top, with an upper, slightly convex portion 1402 and a lower, slightly concave portion 1404, which are joined at their periphery 1406. In one embodiment the upper and lower portions are moulded as one piece and are connected by a vertical peripheral joining wall 1406. The housing 1410 is open at its upper end and includes a threaded inlet pipe 1412 at its lower end, which defines a water inlet opening. The pipe extends into the housing to provide a site for attaching the bladder 1400, which slips over the inwardly extending pipe and is secured by means of a clip or clasp 1430 in this embodiment. Instead, the inwardly extending pipe may be threaded and the lower portion 1404 may have a complementarily threaded neck portion. The upper portion 1402 is provided with a threaded neck and is connected to the threaded portion of the sprayer head 1450. Thus, when water enters through the water inlet opening, it fills the bellows-like bladder 1400. The bellows 1400 adopts a more spherical configuration, pushing the sprayer head 1450 upward and through the opening 1460 in the cap 1462. The cap 1462 is configured similar to the cap 1020 of the FIG. 10 embodiment.

Yet another embodiment of the invention is shown in FIG. 15. In the embodiment of FIG. 15, a bladder 1500 made from a flexible membrane is connected between a water inlet pipe 1512 (formed in a lower end of a housing 1510) and a sprayer head 1520. When water fills the bladder 1500 it expands to adopt a spherical configuration to push the sprayer head 1540 upward and through the cap opening 1530. The side walls of the housing 1510 in this embodiment define an elongate cylinder. Therefore, if the material of the bladder is chosen to be stretchable, as the bladder expands, the side walls constrain the lateral expansion, thereby forcing the bladder to adopt an elongate balloon configuration. It will however be appreciated that the material could simply be a flexible, non-stretchable material, in which the bladder changes shape from a collapsed ball configuration prior to inflation, to a substantially spherical configuration once the bladder is filled with water. Again, a spring (not shown) is provided between the cap 1550 and the bladder neck 1552 to push the bladder 1500 back down when the water pressure is relieved. In order to avoid the cap 1550 from popping off due to the spring pressure, it is provided, in this embodiment, with a threaded hub 1554 engageable with a complementarily threaded upper portion of the inner wall of the housing 1510.

It will be appreciated that the embodiments discussed above are only some implementations of the invention, which makes use of a deformable membrane that can be configured to define a bladder with an inlet and an outlet and is thus re-configurable from a first configuration to a second configuration by the action of water acting on the membrane. Insofar as the membrane defines a bladder, the water pressure may act on an inner surface of the bladder to expand the bladder thereby moving a sprayer head that is secured to the bladder, from a first position to a second position, or the water pressure may act on the outer surface of the bladder to collapse the bladder, thereby moving a sprayer head secured to the bladder, from a first to a second position.

It will be appreciated that any of the above embodiments may make use of a flexible membrane material having a memory that will favour a first, neutral configuration. Even when used with a memory material a spring or other means may be used to assist in returning the flexible membrane to its first configuration.

As there are no sliding components such as those used in standard sprinkler heads, which require a sealing engagement, there is no possibility of debris causing the sprayer head to stay in either the retracted or extended position. Also, the flexible nature of the flexible membrane means that if someone were to tread or drive on the sprinkler device in the extended position, it would just flex downwardly into the housing and not break. Further, the housings are preferably made of a flexible material so that any force exerted on the housing, e.g., driving on the sprinkler device 10 with a motor vehicle when the sprayer head is in the retracted position will merely result in flexing of the components and not breakage.

It will be readily apparent to persons skilled in the relevant arts that various modifications and improvements may be made to the foregoing embodiments, in addition to those already described, without departing from the basic inventive concepts of the present invention.

What is claimed is:

1. A pop-up sprinkler, comprising a housing having an inlet opening for a water supply, the housing further having an opening at an operatively upper end, and a flexible membrane having, in a first configuration, a neutral, concave shape that extends from the upper end of the housing, downward to a lower threaded neck, the membrane being concave in an operatively vertical sectional plane, when viewed from the top, when no external force is applied to the membrane, the flexible membrane being deformable between its neutral, first configuration and a second configuration in which a portion of the flexible membrane is bowed upward, the threaded neck defining a site for securing a sprayer head to the membrane, wherein the supply of water via the inlet opening acts on a lower surface of the flexible membrane to cause the flexible membrane to change configuration from its neutral, concave shape in which the sprayer head is in a first, lower position, and its second configuration in which the sprayer head is in a second, upper position, and wherein the neutral, concave shape of the flexible membrane causes the flexible membrane to return to its concave shape when water pressure to the lower surface of the flexible membrane is removed.

2. The pop up sprinkler of claim 1, wherein the site for securing the sprayer head defines a water outlet opening in the membrane.

3. The pop up sprinkler of claim 1, wherein the second position causes the sprayer head to extend at least partially from the opening in the operatively upper end of the housing.

4. The pop up sprinkler of claim 1, further comprising a cap with a cap opening for allowing the sprayer head to extend through the cap opening.

5. The pop up sprinkler of claim 4, wherein the membrane is mounted to the housing or to the cap so that at least part of the membrane is located within the housing in the first configuration.

6. The pop up sprinkler of claim 1, wherein the flexible membrane includes a circular peripheral portion extending over an upper end of the housing and extending over the outer surface of the housing to define a peripheral lip.

7. The pop up sprinkler of claim 6, wherein the flexible membrane has a wall thickness that varies from the peripheral portion toward the neck.

8. The pop up sprinkler of claim 1, wherein the flexible membrane is constructed of a material that is flexible but has limited stretchability.

9. The pop up sprinkler of claim 1, wherein the flexible membrane is made of a material providing the membrane with a memory that defines the neutral, concave shape as a neutral memory configuration.

10. The pop up sprinkler of claim 1, wherein the housing has a substantially concave configuration such that the opening at the upper end defines a relatively wide opening and the inlet opening is defined by a threaded neck extending from an operatively lower end of the housing for receiving a complementarily threaded riser.

11. The pop up sprinkler of claim 6, further comprising a ring for securing the peripheral lip of the flexible membrane to the housing.

12. The pop up sprinkler of claim 1, wherein the flexible membrane is constructed of Arnitel (a trademark of DSM Engineering Plastics B.V.).

13. The pop up sprinkler of claim 1, wherein the housing is constructed of a flexible material to avoid damage to the housing if a motor vehicle drives over the device.

* * * * *